United States Patent
Rolfes

(12) 
(10) Patent No.: US 6,306,290 B1
(45) Date of Patent: Oct. 23, 2001

(54) WATER FILTER REPLACEMENT INDICATOR

(76) Inventor: Patrick J. Rolfes, 2006 Seadrift Dr., Corona Del Mar, CA (US) 92625

( * ) Notice: Subject to any disclaimer, the term of this patent is extended or adjusted under 35 U.S.C. 154(b) by 0 days.

(21) Appl. No.: 09/604,109

(22) Filed: Jun. 26, 2000

(51) Int. Cl.⁷ .................................................. B01D 35/143
(52) U.S. Cl. ................................ 210/85; 340/607; 22/36; 210/94; 210/138
(58) Field of Search .................................. 210/85, 87, 88, 210/89, 94, 138; 340/603, 607; 222/23, 36

(56) References Cited

U.S. PATENT DOCUMENTS

| | | | |
|---|---|---|---|
| 4,310,828 | * | 1/1982 | Baker . |
| 4,851,818 | * | 7/1989 | Brown et al. . |
| 5,089,144 | * | 2/1992 | Ozkahyaoglu et al. . |
| 5,188,727 | * | 2/1993 | Kurth et al. . |
| 5,190,643 | * | 3/1993 | Duncan et al. . |
| 5,328,597 | * | 7/1994 | Boldt, Jr. et al. . |
| 5,540,107 | * | 7/1996 | Silverman et al. . |
| 5,676,824 | * | 10/1997 | Jeon et al. . |
| 5,935,426 | * | 8/1999 | Giordano et al. . |
| 6,024,867 | * | 2/2000 | Parise . |
| 6,093,313 | * | 7/2000 | Bovaird et al. . |
| 6,119,073 | * | 9/2000 | Havel . |
| 6,214,239 | * | 4/2001 | Renau . |

* cited by examiner

Primary Examiner—Joseph W. Drodge
Assistant Examiner—Terry K. Cecil
(74) Attorney, Agent, or Firm—Gordon K. Anderson

(57) ABSTRACT

A water filter replacement indicator for apparatus that utilizes a filter for purifying water which has a power supply (20) and an auxiliary power supply (22). A timer (24) receives electrical energy from one of the power supplies, generating a first output signal indicating timed intervals. A divider (26) receives this first output signal quantifying the signal until a predetermined number of modulations are perceived at which time it produces a second output signal. A counter (28) receives the second output until a predetermined number of events are perceived at which time it produces a third, fourth and fifth output signal. The third output signal energizes a green light (30) indicating that the filter is operating within its usable life. The fourth output signal energizes a yellow light (32) indicating that the filter is about to reach its predetermined life span. The fifth output signal energizes a flashing red light (34) designating that it is time for filter replacement, further, when the red light is energized the green and yellow light are disengaged.

14 Claims, 3 Drawing Sheets

WATER FILTER REPLACEMENT INDICATOR

TECHNICAL FIELD

The present invention relates to indicators in general. More specifically to a timed indicator that shows when a water filter is to be replaced in an apparatus that uses a filter for purifying water.

BACKGROUND ART

Previously, many types of indicators have been used in endeavoring to provide an effective means to monitor and indicate that a water filter is near or at the end of its useful life and needs to be replaced.

A cursory search of the prior art did not disclose any patents that read directly on the claims of the instant invention, however Kurth et al. in U.S. Pat No. 5,188,727 teaches a water filter unit that has a pair of change water filter indicators, one for each filter cartridge, consisting of discs mounted on a post which are marked in months and years and may be set manually when the filters are changed. The indicators are mounted behind the cover with only the pre-set month and year visible from the outside.

U.S. Pat. No. 5,190,643 issued to Duncan et al. is for a portable water treatment device which uses a vessel with a replaceable filter cartridge inside. A lid has an aperture that communicates with the filter and a gate member that is reciprocally movable between a position closing the aperture in the housing and a position opening the aperture. In the open position water is poured into the filter cartridge through the aperture. An indicator moves one increment during a cyclic movement of the gate member which is limited to a predetermined number of increments preventing further movement when the filter needs to be changed.

Boldt Jr. et al. in U.S. Pat. No. 5,328,597 disclose an electronic unit for monitoring the number of uses of a filter cartridge. This unit is self contained and may be attached to any device that incorporates a water filter. A programmed integrated circuit uses different audio input signals to detect each use of the device and monitors when the device is operational and when the end of the life of the filter is eminent. The integrated circuit is programmed to operate a transducer to produce output signals during each use of the device informing the user that the device is operational, that the predetermined end of the filters useful life is eminent or that its life has expired. The unit includes a battery for supplying power to the transducer and integrated circuit and signals are visualized by light emitting diodes.

Parise in the recently issued U.S. Pat. No. 6,024,867 teaches a counter top water filter unit that includes a carbon particle filter cartridge for filtration. A replaceable electronic display monitor unit is mounted in an outlet housing fitted to the top of the cylindrical filter housing. The state of the life span of the filter cartridge is shown on the display monitor in terms of colored indicator lights which denote whether the filter cartridge is within, nearing an end or outside its expected life span. A green light indicates that the cartridge is in its usable life, a yellow light indicates it is about to reach its predetermined life span and a red light designates that the life span has been reached. The electronic circuit detects the time it takes for a ball to flow through a flow channel that is an integral part of the water flow circuitry thereby comparing this lapsed time to the equivalent amount of water passing through the filter. The solid state circuitry translates this information to the volume of water filtered which determines the life expectancy of the filter cartridge.

Other prior art, common to water pitchers with filters utilize floats and mechanical gears to slide a radial indicator a given direction each time the vessel is filled to its nominal level indicating that the filter should be changed when a pointer has completed its travel.

DISCLOSURE OF THE INVENTION

The life expectancy of a conventional filter cartridge used for potable water is based on two separate principles first the amount of contaminants that are absorbed by the media in the filter itself which is determined by its physical size along with the actual absorption capacity of the specific material. Activated carbon is the most common substance used as the media and removes organic material, chlorine and suspended solids usually as small as 5 microns. Normally when the media has absorbed its limit and the pressure differential through the filter increases the capacity of the filter has been reached. When the filter is saturated the water flow declines and slows down which is important particularly in a gravity feed system.

The second principle of life expectancy is actually the time that the filter is exposed to water because the water supply, in almost all city's, contain a certain amount of bacteria, viruses and other micro-organisms. Since organic matter collected in the filter may serve as a nutrient for the bacteria, in time the micro-organisms multiply contaminating the water. The filter manufactures warn against leaving the filter in place too long therefore time limits are recommended and warnings imposed.

A primary object of the invention is to circumvent this problem by taking the latter approach and warn the user that the time has elapsed and the filter should be changed since it may be obvious, due to the slowing of the operational sequence, that the filter was full of unwanted organic matter etc. It would therefore be prudent, in this matter, to protect the user as a first priority and use elapsed time as the governing factor. Therefore the invention incorporates visual indication of the time that the filter has been in place by using a solid state timing circuit in conjunction with indicating lights. This indication assures to the user that the unit, to which the filter is a part, is safe to use and exactly when changing is necessary. Since logic and colors well known to the public are the most reasonable type of warning, a green light indicates that the filter is operating within its usable life, a yellow light indicates it is about to reach its predetermined life span and a red light designates that it is time for replacement.

An important object of the invention is that the time duration may be altered when a larger capacity filter is used which may lengthen the time span for the green light. This feature is easily accomplished in the preferred embodiment by simply removing a jumper from a connector which places another resistor of a different value in the circuit.

Another object of the invention is that reliability is increased which affects the device in which the invention is connected to or integrally formed. Further, when the filters are not changed on a timely basis, chemicals such as lime etc. may build up and cause a malfunction of the entire unit or at the least a slow down of its functional operation when water is fed by gravity.

Still another object of the invention is that the water filter replacement indicator may be incorporated into existing equipment or it may be a separate device that is added at a later time to an existing device as a detached element. If the invention is built in it may share the same electronic circuit and even the same mounting surface for the indicator lights.

As an example if the apparatus is incorporated into a commercial coffee brewer the solid state circuit may be included on the same printed circuit board also share the same power supply.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
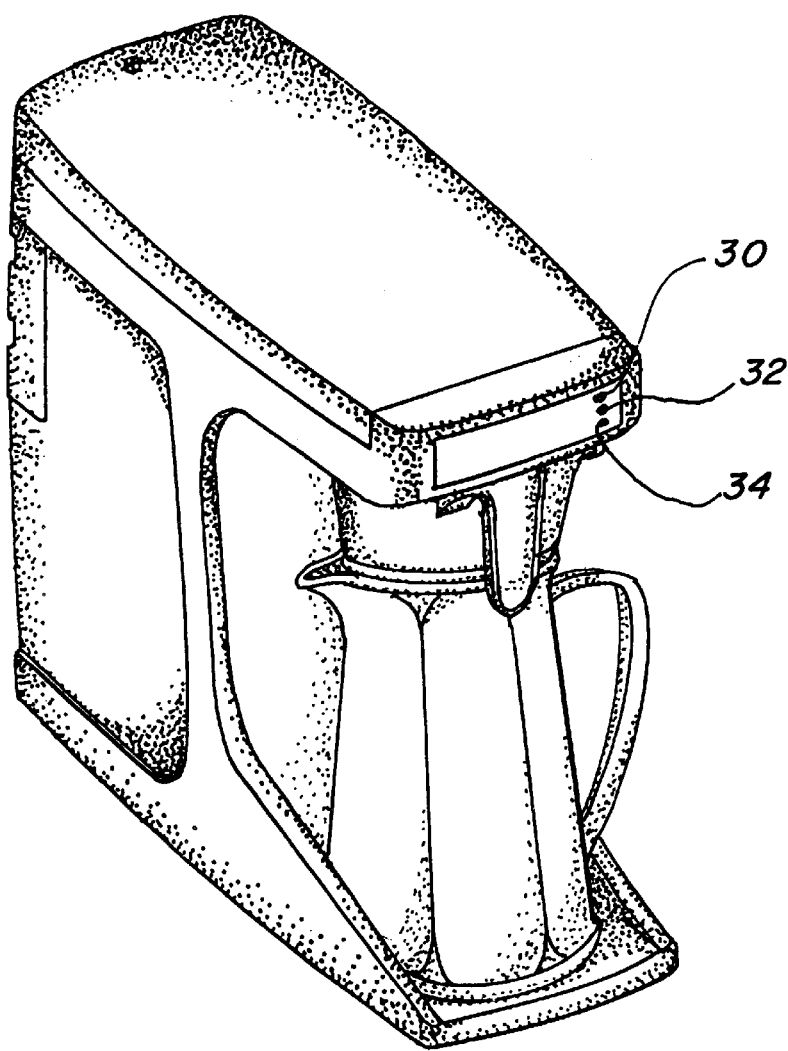
FIG. 1 is a partial isometric view of the preferred embodiment installed in a commercial coffee brewer.
Figure 4:
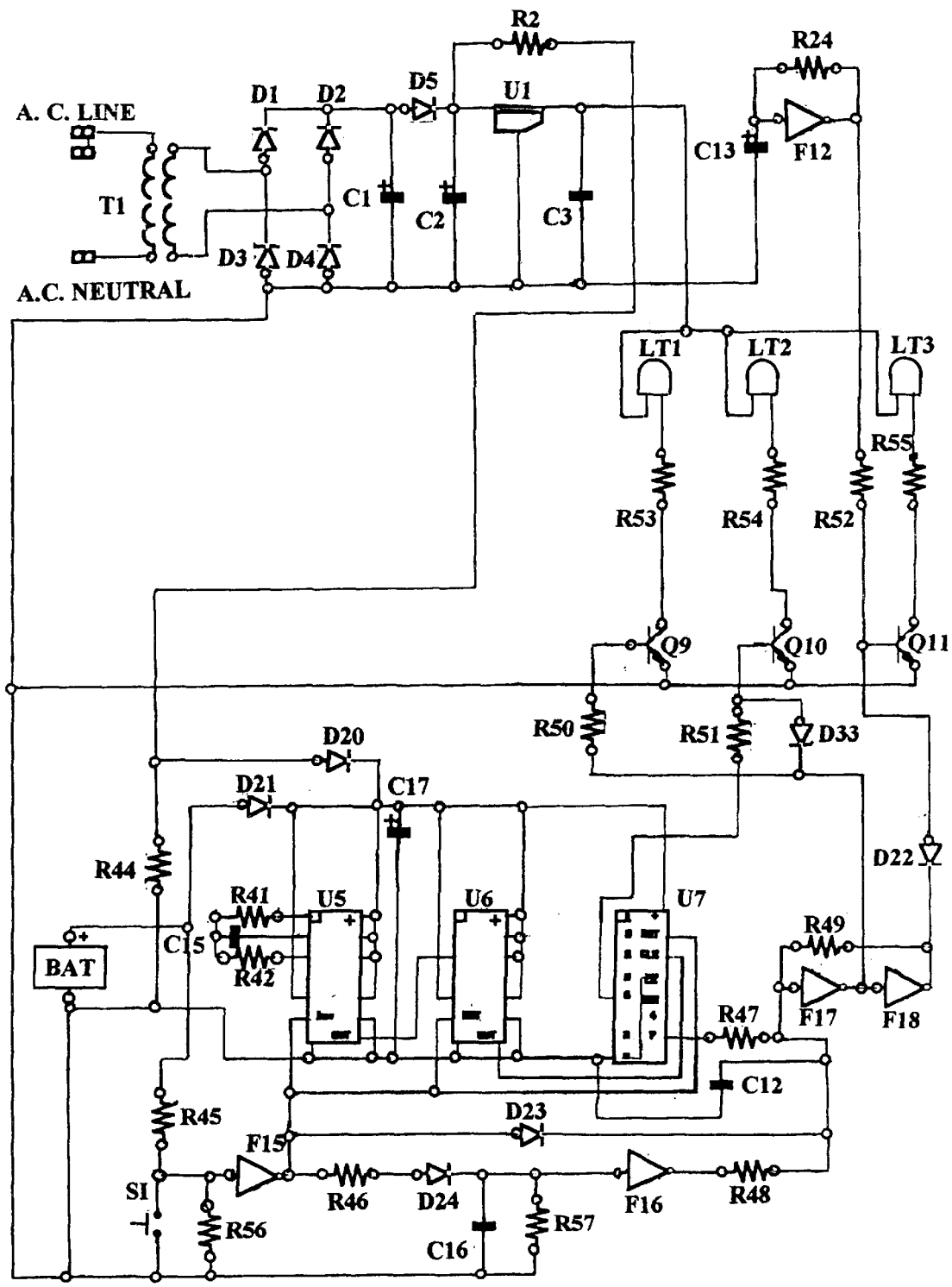
FIG. 4 is an electronic schematic diagram of the preferred embodiment.

The best mode for carrying out the invention is presented in terms of a preferred embodiment. This preferred embodiment is shown in FIGS. 1 thorough 4 and is comprised of a power supply 20 which is an ac-dc inverter circuit having means for converting an alternating current to a direct current utilizing a Wheatstone bridge along with an accompanying voltage reduction created by a transformer and regulation with an integrated circuit, diodes and capacitors. The schematic of FIG. 4 illustrates this circuit with the transformer designated T1 the bridge diodes D1–D5, capacitors C1–C3, resistor R2 and the integrated circuit U1.

A direct current auxiliary power supply 22 in the form of a battery is interconnected with the power supply 20 such that when voltage of the power supply 20 drops below voltage of the auxiliary power supply 22 the auxiliary power supply 22 continues to furnish current. The auxiliary power supply battery, designated as BAT on the schematic, may be any type however an alkaline storage battery is preferred. It will be noted that the circuit will not be activated if the battery produces less than two thirds of its normal power or if the battery is removed even though the power supply 20 is connected.

Timing means consist of a timer 24 a divider 26 and a counter 28. The timer 24 is in the form of a programmable digital timer that receives electrical energy from at least one of the power supplies 20 or 22 and generates a first square wave output signal indicating timed intervals. The timer 24 is designated as U5 in FIG. 4 and utilizes resistors R41 and R42 as well as capacitor C15. It should be noted that the timing rate may be altered by simply changing the value of the resistors R41 and R42 if another elapsed time is required.

The divider 26 is also in the form of a programmable digital timer not unlike the timer 24, and it receives the first square wave output signal from the timer 24 and quantifies the signal until a predetermined number of square wave modulations are perceived. The divider 26 then produces a second square wave output signal. The divider 26 is designated U6 in FIG. 4 does not require any ancillary devices.

The counter 28 is in the form of an octal counter that receives the second square wave output signal from the divider 26 until a predetermined number of square wave events are perceived, the counter 28 then producing a third output signal, a fourth output signal and a fifth output signal. The counter 28 is designated as U7 in FIG. 4 and also stands alone in its functional operation.

Light means consist of a green light 30, a yellow light 32 and a red light 34. The green light 30 utilizes a light circuit and is in electrical communication with the third output signal of the counter energizing the light 30 through the light circuit indicating that the filter is operating within its usable life. The green light 30 is preferably a light emitting diode and is designated as LT1 in the schematic of FIG. 4. The light circuit for the green light 30 is used for switching it on and off and utilizes solid state components in the form of a transistor and other devices which include a transistor Q9, resistors R53, R50, R47 and R49 along with integrated circuits F17 and F18.

The yellow light 32 also utilizes a light circuit and is in electrical communication with the fourth output signal of the counter energizing the light 32 through the light circuit indicating that the filter is about to reach its predetermined life span. The yellow light 32 is preferably a light emitting diode and is designated as LT2 in the schematic of FIG. 4. The light circuit for the yellow light 32 is used for switching it on and off and employs solid state components in the form of a transistor and other devices which include a transistor Q10 and resistors R54, R51 along with diode D33.

The red light 34 also has a light circuit, and an oscillator 36, in electrical communication with the counter 28 fifth output signal which energizes the light 34 through the light circuit with the oscillator 36 producing a momentary interruption in the light circuit creating a flashing effect. The blinking red light 34 designates that it is time for filter replacement. When the red light 34 is energized the counter 28 third output signal disconnects the green light 30 and simultaneously the counter 28 fourth output signal disengages the yellow light 32.

The red light 34 is preferably a light emitting diode and is designated as LT3 in the schematic of FIG. 4. The light circuit of the red light 34 is for switching it on and off and utilizes solid state components in the form of a transistor and other devices which include a transistor Q11, resistors R55, R52, R47 and R49, a diode D22 and integrated circuits F17 and F18. The oscillator 36 uses integrated circuit F12, resistor R24 and capacitor C13.

It should also be noted that while the components described above and designated in the schematic utilize solid state lights other lighting devices may easily replace this preferred embodiment along with the necessary ancillary components.

A reset switch 38 is in communication with the timer 24, divider 26 and counter 28 for returning the timed sequence of all of the devices associated with the timing means to zero. This reset switch 38 requires the following components that are designated on the schematic illustrated in FIG. 4 which include, a push button switch S1, resistors R45,R56, R46,R57 R48, diodes D23 and D34, capacitors C12 and C15 along with integrated circuits F15 and F16.

Figure 2:
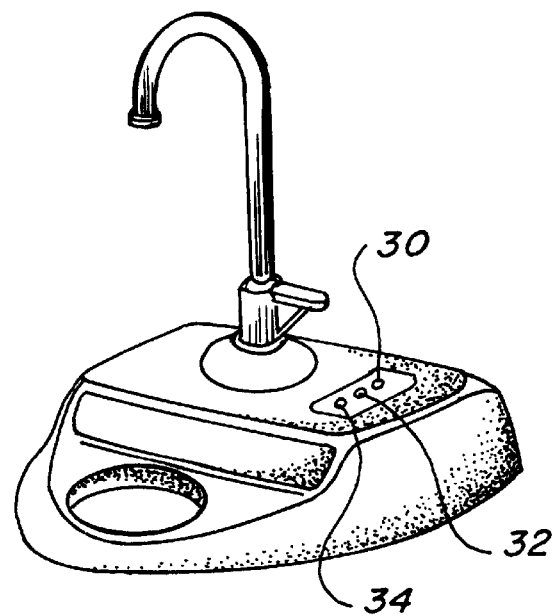
FIG. 2 is a partial isometric view of the preferred embodiment installed in a counter top water purifier.
Figure 3:
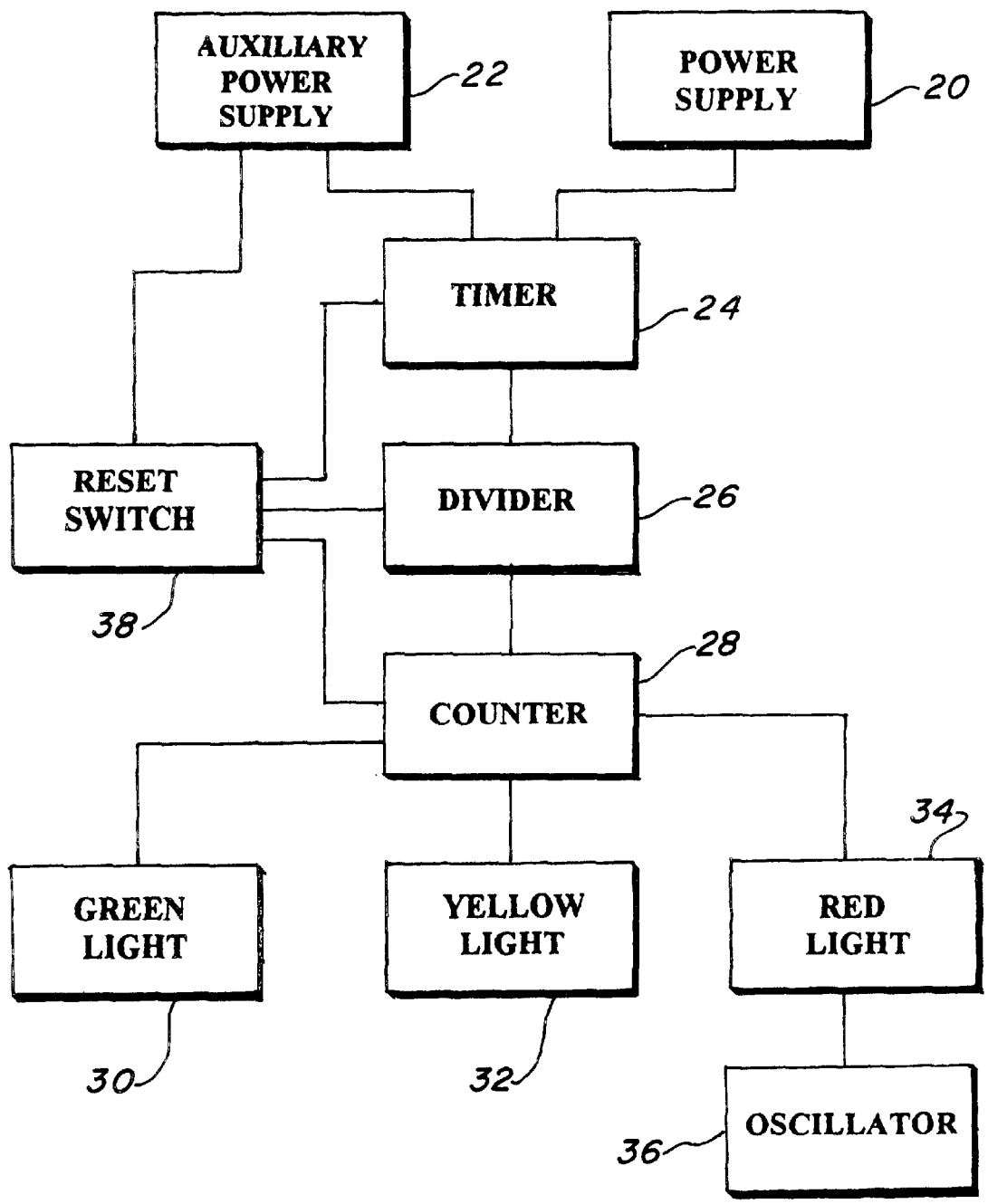
FIG. 3 is a block diagram illustrating the function and operational sequence of the preferred embodiment.

FIGS. 1 and 2 illustrate typical applications in which the invention may be used such as FIG. 1 shows a commercial coffee brewer and FIG. 2 depicts a counter top water purifier. It should also be visualized that the invention may be used in conjunction with this type of apparatus as an integral part of the existing solid state control circuitry or it may be a discrete device that is completely self contained and simply added as another component in the equipment.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

What is claimed is:

1. A water filter replacement indicator for apparatus having a filter for purifying water comprising:
   a power supply including means for converting an alternating current to a direct current;
   an auxiliary power supply interconnected with the power supply such that when voltage of said power supply drops below voltage of the auxiliary power supply the auxiliary power supply continues to furnish current;
   a timer operable to receive electrical energy from at least one of the power supplies and generate a first square wave output signal indicating timed intervals;
   a divider operable to receive the first square wave output signal from the timer quantifying the signal until a predetermined number of square wave modulations are perceived, said divider then producing a second square wave output signal;
   a counter operable to receive the second square wave output signal from the divider until a predetermined number of square wave events are perceived, said counter then producing a third output signal, a fourth output signal and a fifth output signal; and
   light means operable to receive the third, fourth, and fifth output signals from the counter to indicate that the filter is operating within its usable life, the filter is about to reach its predetermined life span and a flashing light designating that it is time for filter replacement.

2. The water filter replacement indicator as recited in claim 1 wherein said light means further comprising,
   a green light having a first light circuit in electrical communication with the counter third output signal energizing said green light through the first light circuit indicating that the filter is operating within its usable life,
   a yellow light having a second light circuit in electrical communication with the counter fourth output signal energizing the yellow light through said second light circuit indicating that the filter is about to reach its predetermined life span, and
   a red light having a third light circuit, including an oscillator, in electrical communication with the counter fifth output signal energizing said red light through the third light circuit allowing the oscillator to produce a momentary interruption in the third light circuit creating a flashing effect designating that it is time for filter replacement, further, when said red light is energized said counter third output signal disconnects the green light and simultaneously said counter fourth output signal disengages the yellow light.

3. The water filter replacement indicator as recited in claim 1 further comprising a reset switch in communication with the timer, divider and counter for returning the timed sequence to zero.

4. A water filter replacement indicator for apparatus having a filter for purifying water comprising:
   a power supply having means for converting an alternating current to a direct current along with an accompanying voltage reduction,
   a direct current auxiliary power supply interconnected with the power supply such that when voltage of said power supply drops below voltage of the auxiliary power supply the auxiliary power supply continues to furnish current,
   a timer operable to receive electrical energy from at least one of the power supplies, generating a first square wave output signal indicating timed intervals,
   a divider operable to receive the first square wave output signal from the timer quantifying the signal until a predetermined number of square wave modulations are perceived, said divider then producing a second square wave output signal,
   a counter operable to receive the second square wave output signal from the divider until a predetermined number of square wave events are perceived, said counter then producing a third output signal a fourth output signal and a fifth output signal,
   a green light having a first light circuit in electrical communication with the counter third output signal energizing said green light through the first light circuit indicating that the filter is operating within its usable life,
   a yellow light having a second light circuit in electrical communication with the counter fourth output signal energizing said yellow light through the second light circuit indicating that the filter is about to reach its predetermined life span, and
   a red light having a third light circuit, including an oscillator, in electrical communication with the counter fifth output signal energizing said red light through the third light circuit allowing the oscillator to produce a momentary interruption in the third light circuit creating a flashing effect designating that it is time for filter replacement, further, when said red light is energized said counter third output signal disconnects the green light and simultaneously said counter fourth output signal disengages the yellow light.

5. The water filter replacement indicator as recited in claim 4 wherein said power supply is an ac-dc inverter.

6. The water filter replacement indicator as recited in claim 4 wherein said auxiliary power supply is an alkaline storage battery.

7. The water filter replacement indicator as recited in claim 4 wherein said timer is a programmable digital timer.

8. The water filter replacement indicator as recited in claim 4 wherein said divider is a programmable digital timer.

9. The water filter replacement indicator as recited in claim 4 wherein said counter is an octal counter.

10. The water filter replacement indicator as recited in claim 4 wherein said green light is a light emitting diode and said first light circuit comprises a transistor, a plurality of resistors and at least two integrated circuits.

11. The water filter replacement indicator as recited in claim 4 wherein said yellow light is a light emitting diode and said second light circuit comprises a transistor, a resistor and a diode.

12. The water filter replacement indicator as recited in claim 4 wherein said red light is a light emitting diode and said third light circuit comprises a transistor, at least one resistor, a diode, and at least one integrated circuit and said oscillator comprises a capacitor a resistor and an integrated circuit.

13. The water filter replacement indicator as recited in claim 4 further comprising a reset switch in communication with the timer, divider and counter for returning the timed sequence to zero.

14. A water filter replacement indicator for apparatus having a filter for purifying water comprising:

a power supply including means for converting an alternating current to a direct current, an auxiliary power supply interconnected with the power supply such that when voltage of said power supply drops below voltage of the auxiliary power supply the auxiliary power supply continues to furnish current, a timer operable to receive electrical energy from at least one of the power supplies, generating a first square wave signal indicating timed intervals, a divider operable to receive the timer first signal quantifying the signal until a predetermined number of square wave modulations are perceived, said divider then producing a second square wave output signal, a counter operable to receive the second signal from the divider until a predetermined number of square wave events are perceived, said counter then producing plurality of output signals, a plurality of lights adapted to receive output signals from the counter with the lights indicating that the filter is operating within its usable life, the filter is about to reach its predetermined life span or a solitary flashing light designating that it is time for filter replacement.

* * * * *